United States Patent
Smith et al.

(10) Patent No.: US 11,818,031 B2
(45) Date of Patent: Nov. 14, 2023

(54) AUTOMATED INTERNET PROTOCOL (IP) ROUTE UPDATE SERVICE FOR ETHERNET LAYER 3 (L3) IP STORAGE AREA NETWORKS (SANS)

(71) Applicant: DELL PRODUCTS L.P., Round Rock, TX (US)

(72) Inventors: Erik Smith, Douglas, MA (US); Joseph LaSalle White, San Jose, CA (US); Claudio Desanti, Santa Cruz, CA (US); Martin Gilbert Belanger, Cameron, NC (US); Douglas Lang Farley, Round Rock, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 160 days.

(21) Appl. No.: 17/192,629

(22) Filed: Mar. 4, 2021

(65) Prior Publication Data
US 2022/0286377 A1 Sep. 8, 2022

(51) Int. Cl.
*H04L 45/02* (2022.01)
*H04L 45/021* (2022.01)
*G06F 3/06* (2006.01)

(52) U.S. Cl.
CPC .......... *H04L 45/021* (2013.01); *G06F 3/0604* (2013.01); *G06F 3/067* (2013.01); *G06F 3/0635* (2013.01)

(58) Field of Classification Search
CPC ... H04L 45/021; G06F 3/0604; G06F 3/0635; G06F 3/067
See application file for complete search history.

(56) References Cited

U.S. PATENT DOCUMENTS

| | | |
|---|---|---|
| 10,075,524 B1 | 9/2018 | Bshara |
| 10,409,511 B1 | 9/2019 | Subbarao |
| 10,592,144 B2 | 3/2020 | Roberts |
| 11,221,972 B1 | 1/2022 | Raman |
| 11,249,937 B1 | 2/2022 | Bshara |
| 11,442,652 B1 | 9/2022 | Dailey |
| 2007/0156919 A1 | 7/2007 | Patti |

(Continued)

OTHER PUBLICATIONS

"NVM Express TM over Fabrics," revision 1.1, Oct. 29, 2019, [online], [Retrieved Aug. 29, 2022] Retrieved from Internet <URL:https://nvmexpress.org> (83pgs).

(Continued)

*Primary Examiner* — Steven Hieu D Nguyen
(74) *Attorney, Agent, or Firm* — NORTH WEBER & BAUGH LLP

(57) ABSTRACT

Systems and methods provide modern storage networks, such as those utilizing a non-volatile memory express over Fabric (NVMe-oF) system, with connectivity options that meet low-latency and high-throughput demands. In certain embodiments, this is accomplished by enabling network entities to acquire and utilize network information, including discovery information, to dynamically manage routing tables and build routes, e.g., to allow a host to send out frames through desired interfaces to reach target destinations. An automated IP routing update service allows for dynamically creating, reading, updating, and deleting functions of otherwise static IP routing table entries to streamline functions in the storage fabric.

20 Claims, 14 Drawing Sheets

(56) References Cited

U.S. PATENT DOCUMENTS

| | | |
|---|---|---|
| 2010/0005190 A1 | 1/2010 | Shah |
| 2012/0331173 A1 | 12/2012 | Overcash |
| 2015/0365457 A1 | 12/2015 | Dvir |
| 2018/0167352 A1* | 6/2018 | Worley .............. H04L 69/22 |
| 2018/0270119 A1* | 9/2018 | Ballapuram ........ H04L 67/1097 |
| 2019/0042144 A1 | 2/2019 | Peterson |
| 2019/0188079 A1 | 6/2019 | Kohli |
| 2019/0377496 A1 | 12/2019 | Olarig |
| 2020/0136943 A1* | 4/2020 | Banyai .............. H04L 49/25 |
| 2020/0136996 A1 | 4/2020 | Li |
| 2020/0137161 A1 | 4/2020 | Chintada |
| 2020/0226077 A1* | 7/2020 | Kang ............... G06F 13/1668 |
| 2020/0252344 A1 | 8/2020 | Krivenok |
| 2020/0278893 A1 | 9/2020 | Niell |
| 2020/0327074 A1 | 10/2020 | Subbarao |
| 2020/0409893 A1* | 12/2020 | Puttagunta ........... H04L 69/16 |
| 2021/0064281 A1 | 3/2021 | Satapathy |
| 2021/0084085 A1 | 3/2021 | Jones |
| 2021/0089236 A1 | 3/2021 | Yang |
| 2021/0117242 A1 | 4/2021 | Van De Groenendaal |
| 2021/0243255 A1 | 8/2021 | Perneti |
| 2021/0247935 A1 | 8/2021 | Beygi |
| 2021/0263686 A1* | 8/2021 | Satapathy ............ G06F 3/067 |
| 2021/0334206 A1 | 10/2021 | Colgrove |
| 2021/0397351 A1* | 12/2021 | Dhatchinamoorthy ................... G06F 3/0607 |
| 2022/0014592 A1 | 1/2022 | Kachare |
| 2022/0027076 A1 | 1/2022 | Reichbach |
| 2022/0045969 A1 | 2/2022 | L'Ecuyer |
| 2022/0050858 A1 | 2/2022 | Karr |
| 2022/0066799 A1 | 3/2022 | Pinto |
| 2022/0091754 A1 | 3/2022 | Raman |
| 2022/0091872 A1 | 3/2022 | Huilgol |
| 2022/0164120 A1 | 5/2022 | Kannan |
| 2022/0215111 A1 | 7/2022 | Ekins |
| 2022/0231905 A1 | 7/2022 | Dhatchinamoorthy |
| 2022/0263898 A1 | 8/2022 | Jennings |
| 2023/0026570 A1 | 1/2023 | Sampathkumar |

OTHER PUBLICATIONS

Non-Final Office Action dated Sep. 29, 2022, in U.S. Appl. No. 17/486,805. (17 pgs).

Notice of Allowance and Fee(s) Due dated Mar. 3, 2023, in U.S. Appl. No. 17/486,805. (8 pgs).

Notice of Allowance and Fee(s) Due dated Jun. 20, 2023, in U.S. Appl. No. 17/486,805. (7 pgs).

* cited by examiner

AUTOMATED INTERNET PROTOCOL (IP) ROUTE UPDATE SERVICE FOR ETHERNET LAYER 3 (L3) IP STORAGE AREA NETWORKS (SANS)

BACKGROUND

A. Technical Field

The present disclosure relates generally to information handling systems. More particularly, the present disclosure relates to network communications systems and methods, such as automatic IP route update services for L3 IP SANs.

B. Background

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

IP SAN protocols that operate in an L3 (i.e., routed) topology suffer from IP routing problems related to the concept of having a default gateway, such as only a single default gateway being defined per network namespace. Attempts to mitigate such IP routing problems in existing L3 IP SANs are highly labor-intensive and tend to be prone to error.

Accordingly, it is highly desirable to find new and more efficient ways to overcome IP routing problems in networks such as IP SANs.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

DETAILED DESCRIPTION OF EMBODIMENTS

Figure 1:
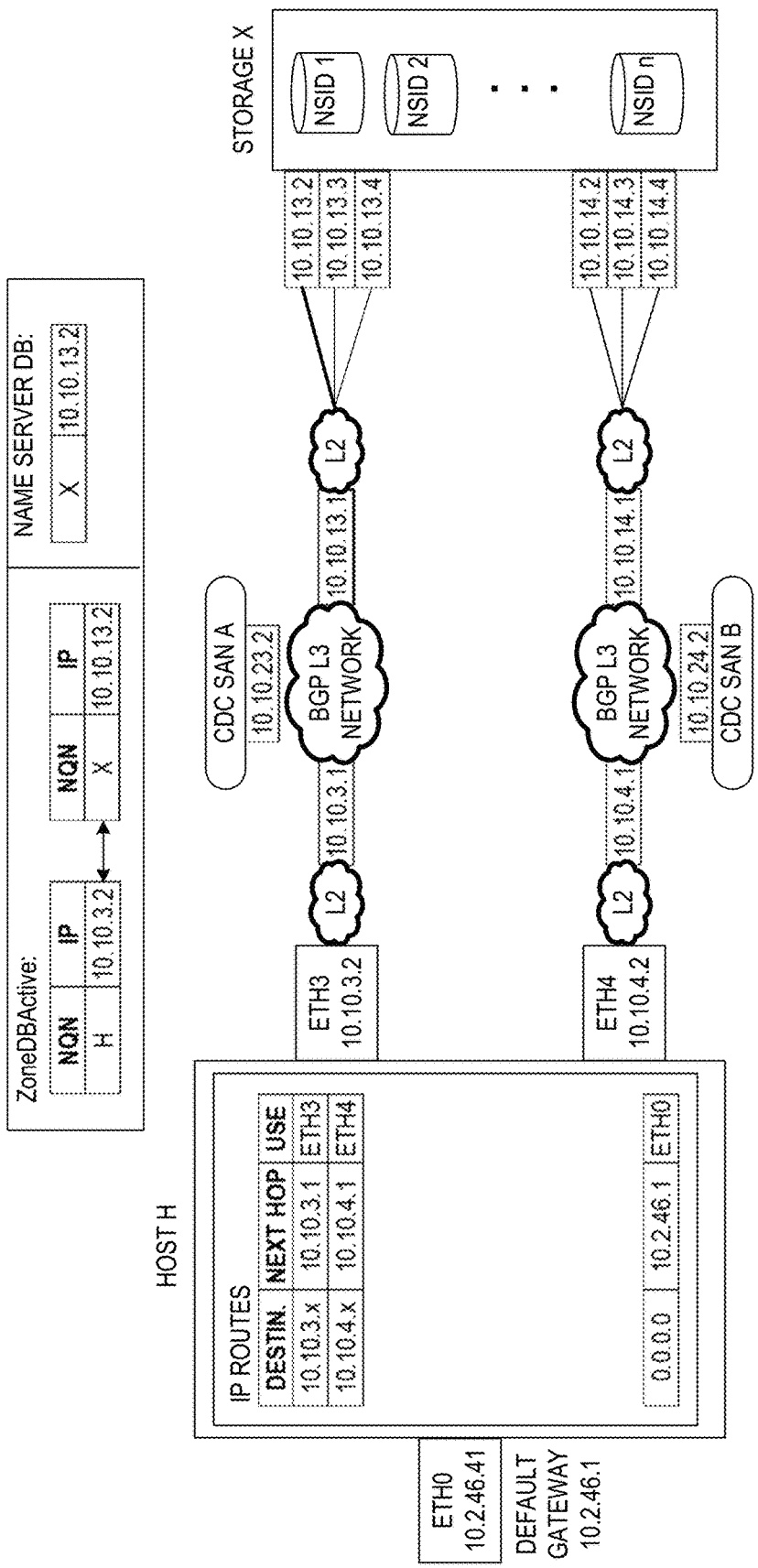
FIG. 1 depicts an exemplary Non-Volatile Memory express over Fabric (NVMe-oF) system according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms, and any examples are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

In one or more embodiments, a stop condition may include: (1) a set number of iterations have been performed; (2) an amount of processing time has been reached; (3) convergence (e.g., the difference between consecutive iterations is less than a first threshold value); (4) divergence (e.g., the performance deteriorates); and (5) an acceptable outcome has been reached.

It shall be noted that although embodiments described herein may be generally described within the context of calls, commands, and responses, e.g., a multicast DNS (mDNS) response, applied to NVMe-oF fabric transports in L3 IP SANs, aspects of the present disclosure are not so limited. Accordingly, the aspects of the present disclosure may be applied or adapted for use in other contexts, using any number and type of commands, information, fabric transport and translating mechanisms, etc., to efficiently exchange information across information handling systems according to the objectives of the present disclosure.

In this document, the terms "routing table" and "IP routing table" are used interchangeably. Similarly, the terms "configuring" and "building" a routing table are used interchangeably. Each reference/document mentioned herein is incorporated by reference herein in its entirety.

FIG. 1 depicts an exemplary NVMe-oF system according to embodiments of the present disclosure. NVMe-oF system 100 may be implemented as an Ethernet L3 IP SAN and, in one or more embodiments, may comprise Host H and Storage X that, in the example in FIG. 1, are coupled via a routed L3 networks comprising CDCs (denoted as CDC SAN A and CDC SAN B) that may perform discovery and inventory management functions associated with respective SAN A and SAN B. Host H in FIG. 1 is communicatively coupled to three network interfaces eth0, eth3 and eth4 that each may communicate with a different network. As depicted, network interface eth0 has IP address 10.2.46.21, network interface eth3 has IP address 10.10.3.2, and network interface eth4 has IP address 10.10.4.2. A person of skill in the art will appreciate that each interface, in turn, may be communicatively coupled with any number of entities or components. For example, eth3 is communicatively coupled, via CDC SAN A, with ports on Storage X that are denoted as having IP addresses 10.10.13.2 through 10.10.13.4. Similarly, eth4 is communicatively coupled, via CDC SAN B, with ports having IP addresses 10.10.14.2 through 10.10.14.4.

In operation, it is desirable that Host H be able to initiate communication with CDC SAN A and CDC SAN B to discover and communicate with respective ports 10.10.13.2 through 10.10.13.4 and 10.10.14.2 through 10.10.14.4 on Storage X. Assuming that Host H seeks to access Storage X at destination IP address 10.10.13.2 and at IP address 10.10.14.2, since these two destination IPs are considered to be on different networks than Host H (i.e., they do not match any of the existing allowable destination addresses 10.10.3.x or 10.10.4.x that the IP routing table of Host H may be configured for) and since the routing table of Host H contains no entry for either CDC SAN A and CDC SAN B as destination address, Host H would, due to a lack of viable alternatives, route packets to storage port 10.10.13.2 or 10.10.14.2 via interface eth0, having IP address 10.2.46.41. In other words, Host H would utilize an interface that is connected to the default gateway. However, sending out discovery traffic or NVMe-oF traffic via a default gateway, e.g., on a local area network (LAN), is suboptimal for various reasons, including problems associated with mixing transport traffic with a management network to access the same namespace, creating potential network security issues, and the like.

Existing approaches to mitigate such problems involve manually adding routes to Host H's IP routing table, for example, to identify next hop 10.10.3.1 and interface 10.10.3.2 as entries that are associated with the destination IP address 10.10.23.2 for CDC SAN A, such as to ensure that traffic destined for CDC SAN A egresses through interface eth3 instead of the interface connected to the default gateway. To access storage ports 10.10.13.2 and 10.10.14.2 via respective network interfaces eth3 and eth4, IP routes would have to be manually pre-defined. This is typically done by statically configuring IP routes in a manner such that packets sent to storage port 10.10.13.2 will always be sent out from interface eth3, e.g., to the next hop having IP address 10.10.3.1, and packets sent to storage port 10.10.14.2 will always be sent out from interface eth4, e.g., to the next hop having IP address 10.10.4.1.

In practice, this requires the involvement of an administrator who manually adds appropriate routes to Host H's IP routing table, for example, each time a configuration changes. Such approaches are cumbersome and inefficient. In addition, because of the efforts involved with configuring and maintaining static routes, most IP SAN customers prefer to keep host and storage ports on the same Ethernet layer 2 (L2) network to communicate in the same broadcast domain. Overall, these solutions are suboptimal and limit the practical size that an IP storage network can have to about 1,000 ports or less. Accordingly, it would be desirable to have IP SANs that can accommodate up to 10,000 ports or more, e.g., to provide similar scaling characteristics as other NVMe-oF transports (e.g., Fibre Channel).

Various embodiments presented herein allow entities in a network, such as a NVMe-oF network, to obtain and utilize network information that can aid in dynamically managing routing tables to build routes in a manner such that Host H can send out frames through desired interfaces, here, eth3 or eth4, to more efficiently reach target destinations. This provides modern storage networks with connectivity options that enhance data services performance when compared to existing designs. In one or more embodiments, an automated IP routing update service may be used to dynamically create, read, update, and delete functions of otherwise static IP routing table entries to streamline such functions in a storage fabric. As discussed in greater detail below, this may be accomplished by a process that facilitates a combination of information discovered (e.g., via mDNS) or returned in response to the NVMe-oF data transport protocol's Get Log Pages command that may be transmitted to a CDC.

It is noted that the system depicted in FIG. 1 is not limited to the constructional detail shown there or described in the accompanying text. As those skilled in the art will appreciate, embodiments herein are not limited to a dual rail SAN topology with isolated networks that facilitate redundancy. In one or more embodiments, the network in FIG. 1 may comprise, for example, a single CDC and two or more logically separated SANs in the form of logical dual rail SANs.

Figure 2:
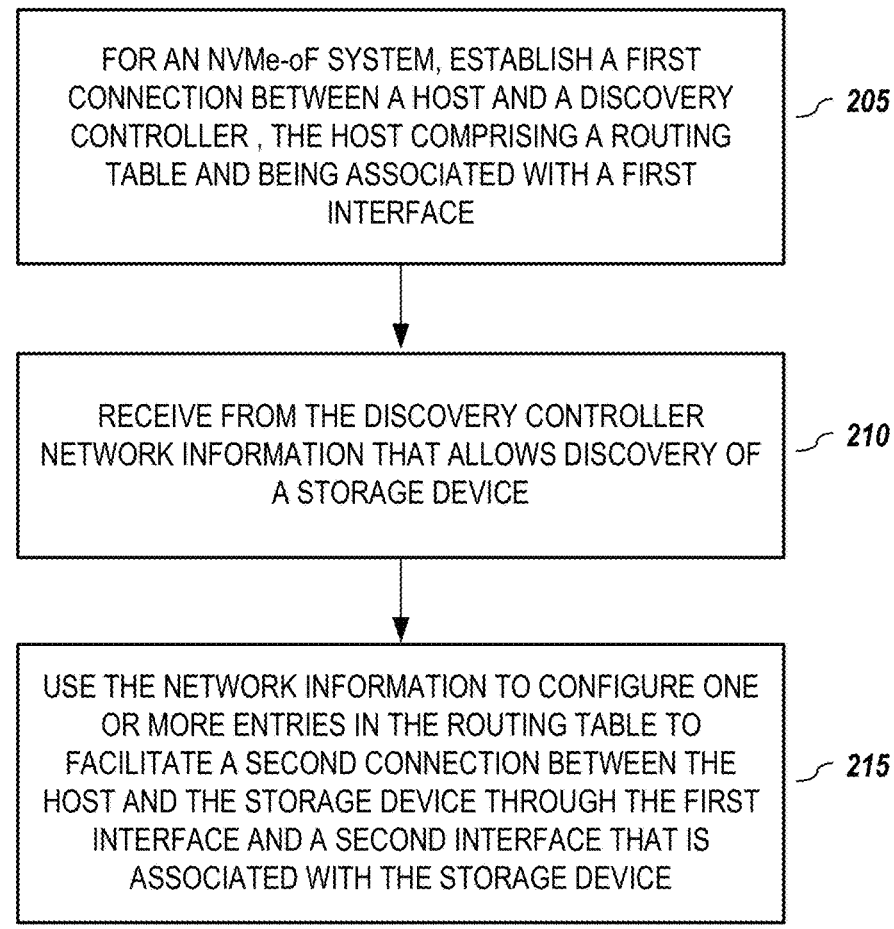
FIG. 2 depicts a flowchart of an exemplary process for dynamically managing routing tables in an NVMe-oF system according to embodiments of the present disclosure.

FIG. 2 depicts a flowchart of an exemplary process for dynamically managing routing tables in an NVMe-oF system according to embodiments of the present disclosure. In one or more embodiments, process 200 may begin when, for the NVMe-oF system that may comprise first and second networks or sub-networks, such as the host and storage networks depicted in FIG. 1, a connection is established (205) between a host that may be associated with the first network and a discovery controller that may be associated with the second network. The host may comprise a first interface and be associated with a routing table.

In one or more embodiments, the host may receive (210) from the discovery controller network information that allows discovery of a storage device associated with the second network. The host may use (215) the network information to configure one or more entries in its routing table to facilitate a connection to the storage device, e.g., through the first interface and/or a second interface that is associated with the storage device.

It shall be noted that: (1) certain steps may optionally be performed; (2) steps may not be limited to the specific order set forth herein; (3) certain steps may be performed in different orders; and (4) certain steps may be done concurrently.

Various implementations of process 200 are discussed in greater detail with reference to FIGS. 3, 5-7, and 9-12 below. For clarity, components similar to those shown in FIG. 1 are labeled in the same manner. Not shown are storage management interfaces and other components that one of skill in the art would readily recognize as necessary for the proper operation of a networks such as the NVMe-oF system depicted therein.

Figure 3:
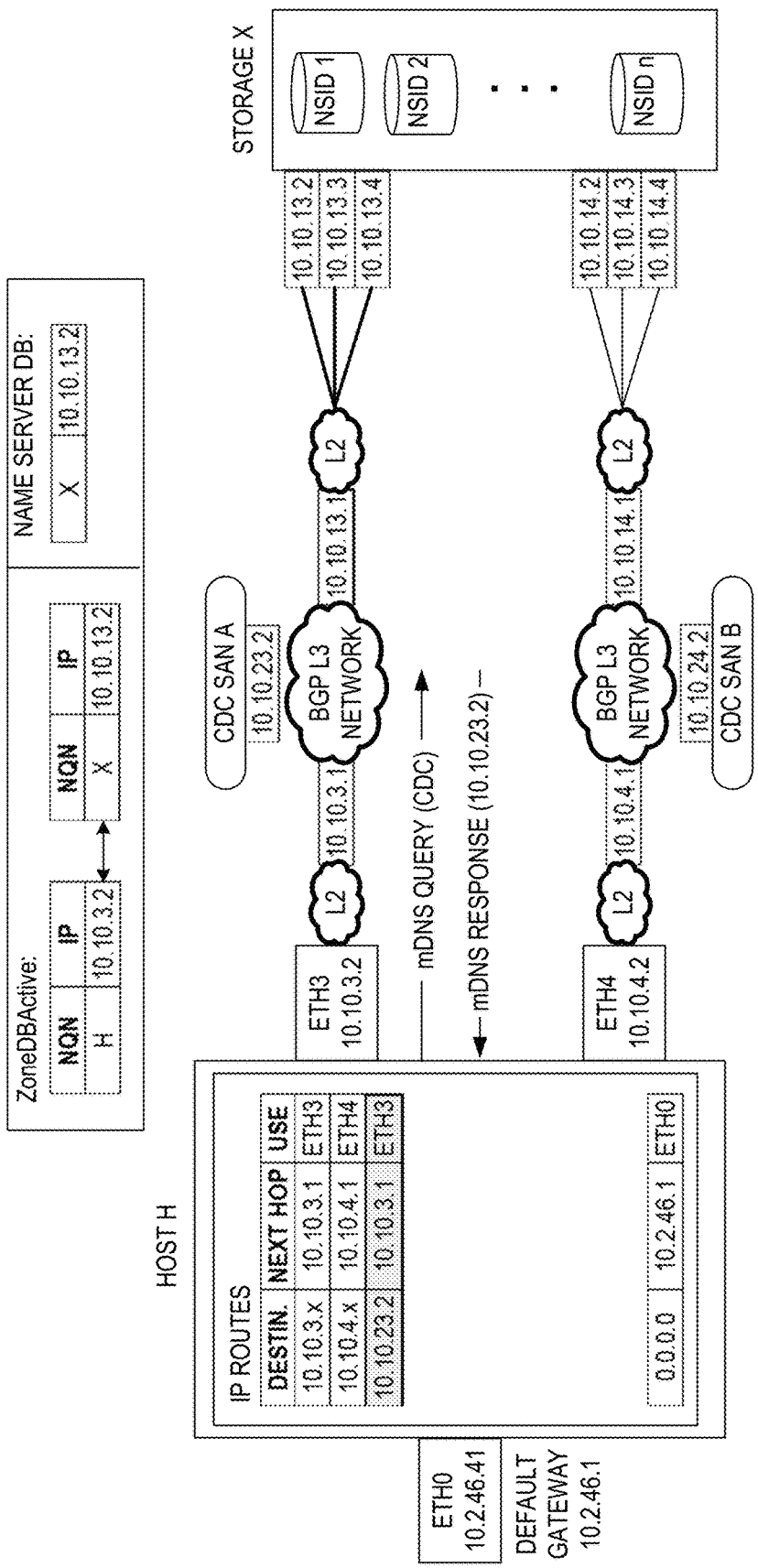
FIG. 3 depicts the use of a multicast Domain Name System (mDNS) query to configure an IP routing table in the exemplary NVMe-oF system in FIG. 1 according to embodiments of the present disclosure.

FIG. 3 depicts the use of an mDNS query to configure an entry in the IP routing table in the exemplary NVMe-oF system in FIG. 1 according to embodiments of the present disclosure. At shown in FIG. 3, ZoneDBActive contains an entry that allows Host H to access interface 10.10.13.2 at Storage X. Further, Name Server DB contains an entry that indicates that interface 10.10.13.2 is connected to CDC SAN A.

In common Fibre Channel (FC) networks, once a host connects to the FC network and a link is established, the host sends out fabric login to a well-known address and receives an FC address identifier that is used as source address to communicate with other FC ports. Unlike in FC networks, hosts in Ethernet networks have no well-known address or other suitable means available to easily obtain the CDC's IP address and route frames to it. Instead, the host must discover the IP address of the CDC. For example, once a host attaches to an Ethernet network, it needs to discover those entities that are attached to that network before accessing exposed NVMe namespaces. One or more embodiments herein facilitate easy discovery of IP addresses by utilizing information provided by entities such as CDC SAN A, e.g., self-identifying information that is provided in a response to a query, such as an mDNS query that is sent out on a multicast address (here, via interfaces eth3 and eth4) and that is looking for, e.g., a _nvme-disc or similar service. The response by an entity that supports that service may directly or indirectly identify CDC SAN A. In one or more embodiments, IP address 10.10.23.2 of the CDC that is associated with SAN A may be discovered, e.g., by extracting IP address 10.10.23.2 from the mDNS responses to the mDNS query. The interface at which the mDNS response has been received, e.g., eth3, may be used to create an IP route entry for Host H in Host H's routing table.

In addition, the source IP address (e.g., 10.10.3.1) of the mDNS response may be entered as the next hop address. In this manner, the IP routing table can be dynamically configured and enable Host H to send out frames to the correct destination(s) via predetermined or known interfaces eth3 and eth4.

A person of skill in the art will appreciate that similar considerations apply to CDC SAN B and its IP routing table, which for sake of simplicity may not be shown in FIG. 3.

Figure 4:
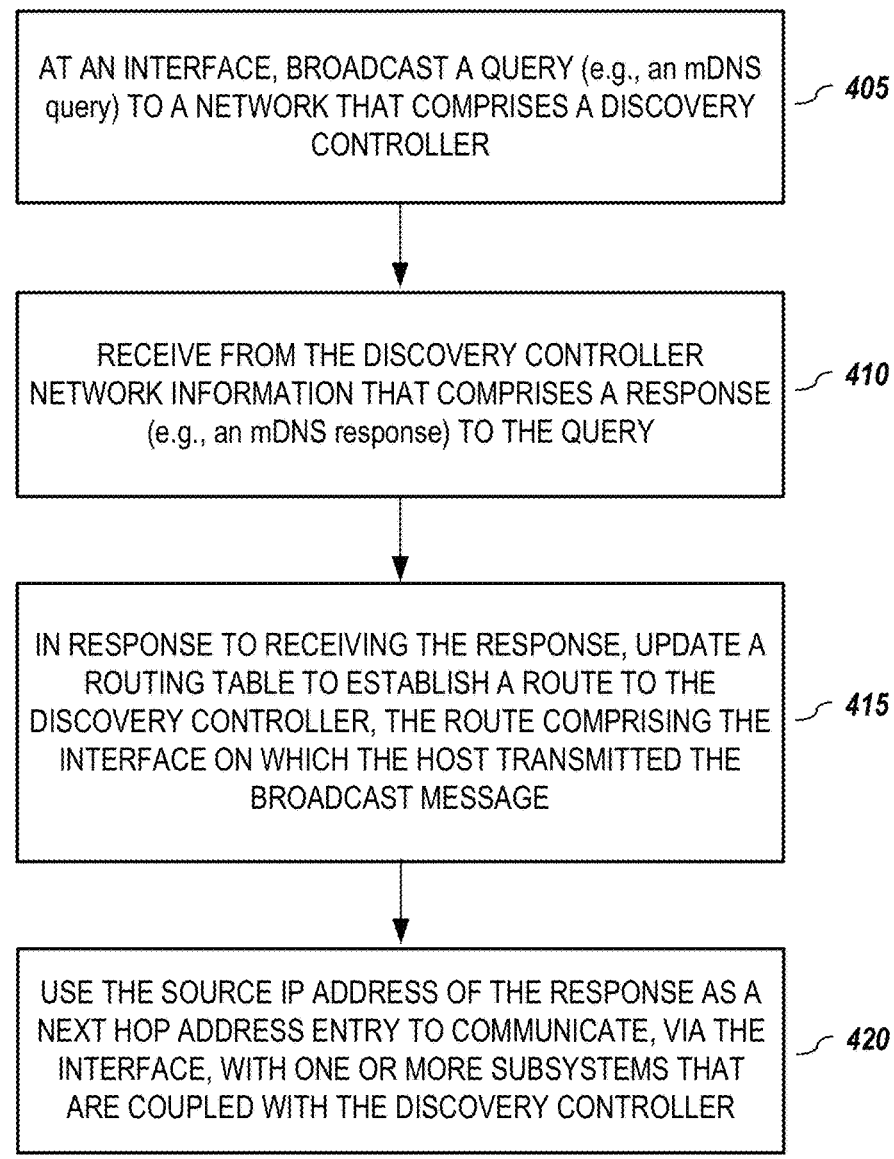
FIG. 4 depicts a flowchart of an exemplary process for using an mDNS query to configure an IP routing table according to embodiments of the present disclosure.

FIG. 4 depicts a flowchart of an exemplary process for using an mDNS query to configure an IP routing table according to embodiments of the present disclosure. In one or more embodiments, process 400 may begin when a host broadcasts (405), e.g., at one of its interfaces, a query, such as an mDNS query, to a routed network (e.g., a BGP routed L3 network) that comprises a CDC associated with a SAN.

In one or more embodiments, the host may receive (410) from the discovery controller network information that comprises an mDNS response to the mDNS query. The mDNS response may comprise self-identifying information from the discovery controller, such as an IP address that the host may use to communicate with discovery controller.

In one or more embodiments, in response to receiving the mDNS response, the host may update (415) its routing table, e.g., by configuring one or more table entries, to establish a route to the discovery controller that associates the discovery controller with the interface on which the host transmitted the broadcast message.

In one or more embodiments, updating the routing table may comprise the host using (420) the source IP address of the mDNS response to create an entry for a next hop address. This enables the host to communicate, via the interface, with the discovery controller.

Figure 5:
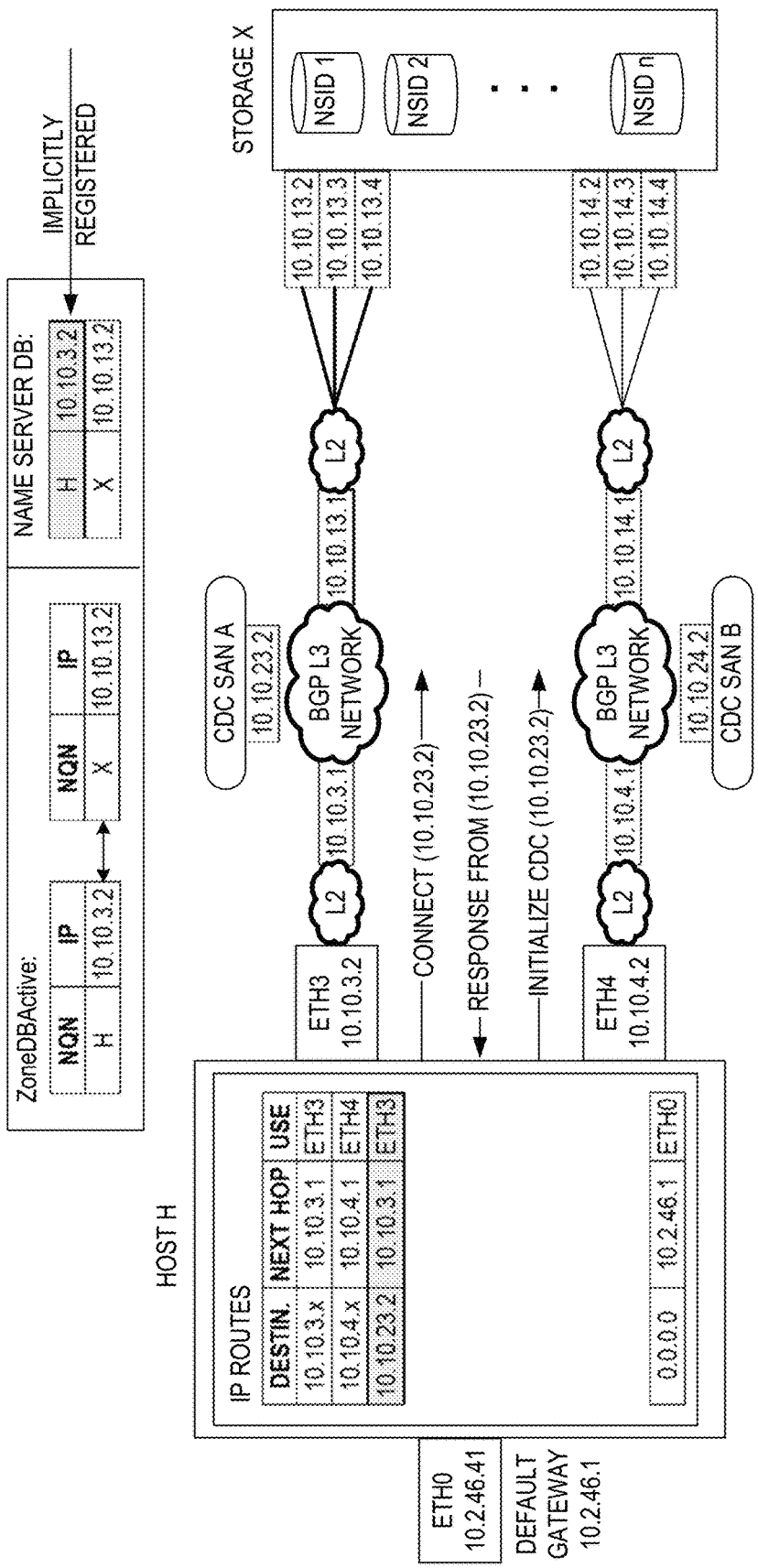
FIG. 5 depicts connecting and initializing a Centralized Discovery Controller (CDC) according to embodiments of the present disclosure.

FIG. 5 depicts connecting and initializing a CDC according to embodiments of the present disclosure. Same numerals as in FIG. 1 denote similar elements. For purposes of brevity, a description of their functions is not repeated. In one or more embodiments, the result of the discovery of a service via an mDNS query, as illustrated in FIG. 3, may be used in a controller initialization process that involves using the new entry, here in FIG. 5, the destination address 10.10.23.2, the next hop address 10.10.3.1, and interface eth3 to establish a connection and exchange information with CDC SAN A to set up CDC SAN A for certain uses, e.g., according to NVMe or other protocols.

In one or more embodiments, once a connection is established, e.g., prior to CDC SAN A sending out a response to a connection request by Host H, CDC SAN A may use some of all information in that connection request to update its name server database, e.g., by adding a NVMe Qualified Name (NQN) "H" and the IP address 10.10.3.2 of the Host H's interface to the name server database, to indicate that Host H is implicitly registered with the CDC SAN A's IP address. It is understood that any type of information or command, e.g., a registration command that comprises a symbolic name, may be used to explicitly register Host H with CDC SAN A such as to enable Host H to be more easily identified by the SAN administrator.

Figure 6:
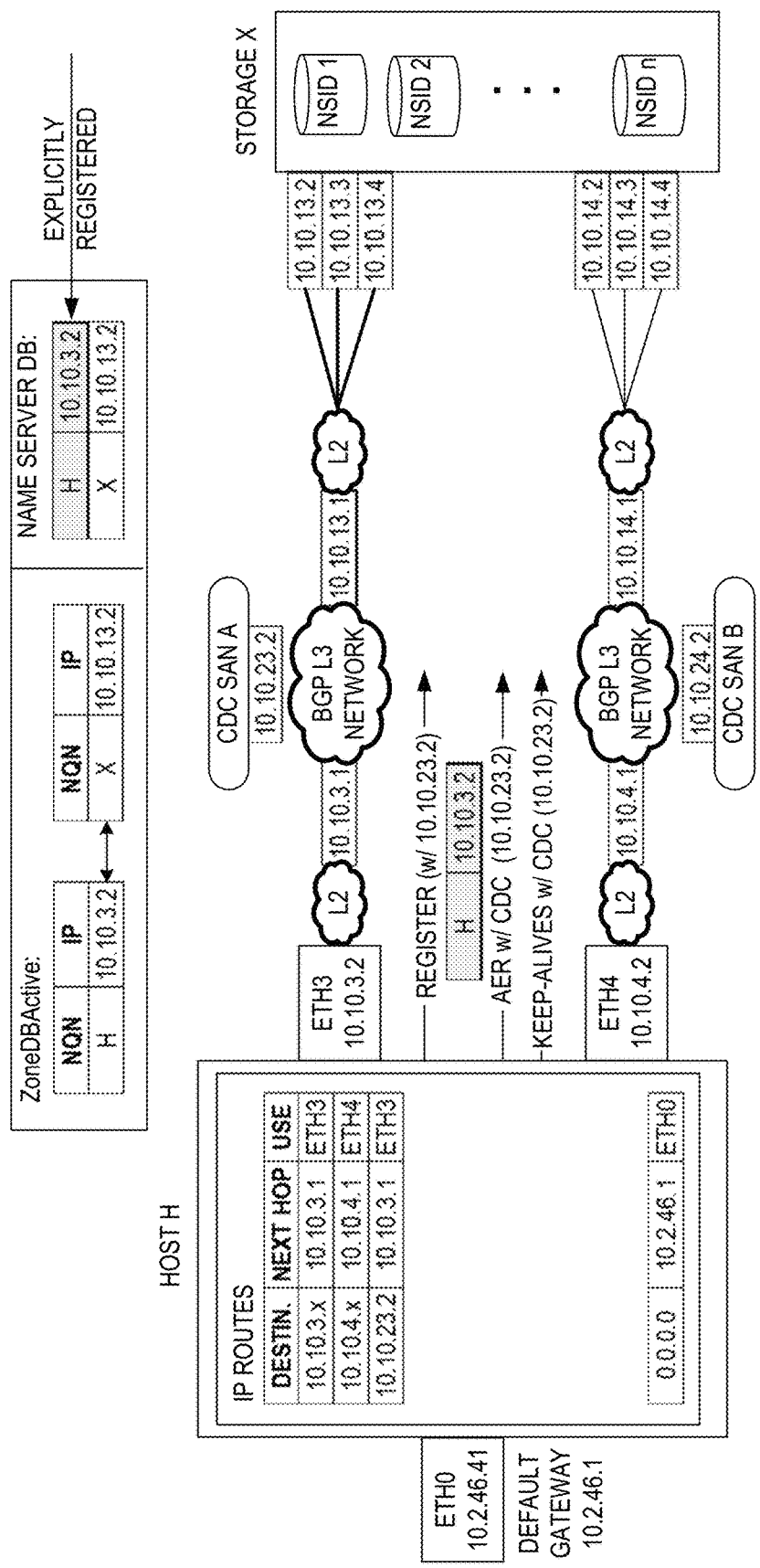
FIG. 6 depicts registering with a CDC according to embodiments of the present disclosure.

In one or more embodiments, dynamically updating the IP route table and/or name server database, advantageously, enables Host H to connect with and to initialize with CDC SAN A to facilitate proper operation in the NVMe-oF environment depicted in FIG. 5. As depicted in FIG. 6, dynamically updating the IP route table and/or name server database, may further enable Host H to register Host H with CDC SAN A and to communicate Asynchronous Event Registrations (AERs), keep-alive messages, and other information with CDC SAN A.

Figure 7:
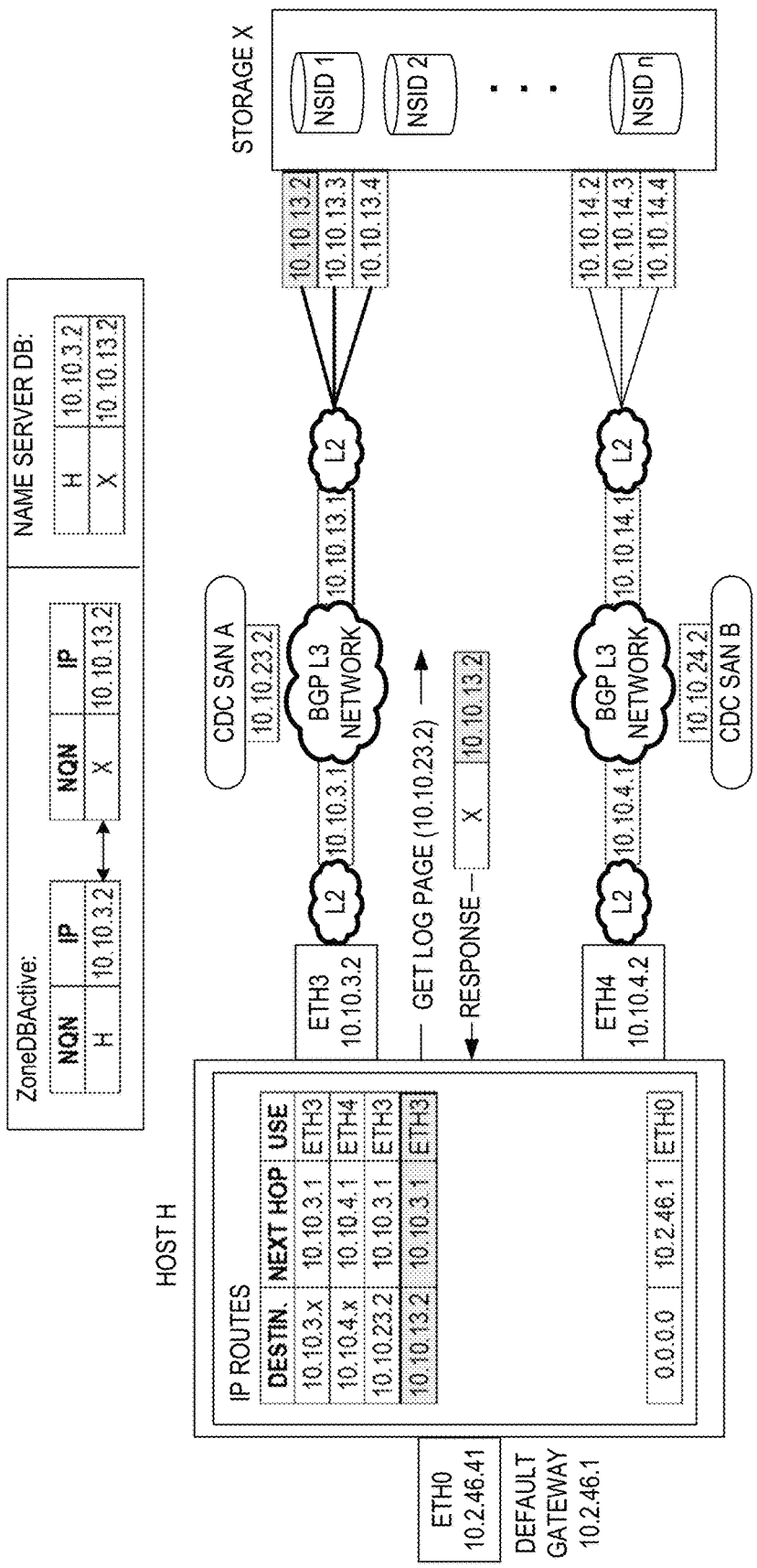
FIG. 7 depicts obtaining network information for configuring an IP routing table according to embodiments of the present disclosure.

FIG. 7 depicts obtaining network information for configuring entries in an IP routing table according to embodiments of the present disclosure. In one or more embodiments, once CDC SAN A is set up and initialized, Host H may use CDC SAN A to discover entities, such as ports (e.g., 10.10.13.2) on Storage X that may expose NVMe namespaces, i.e., storage targets, that Host H is coupled to via SAN A. In one or more embodiments, discovery may comprise Host H using the acquired entry in its IP routing table, which identifies the CDC SAN A's IP address, to send to CDC SAN A an NVMe-oF Get Log Page command to request one or more discovery log entries. A discovery log entry may comprise information about one or more subsystems, such as for example storage port IP address 10.10.13.2 in FIG. 7.

In one or more embodiments, once CDC SAN A responds to the discovery log entry request, Host H may receive the CDC SAN A's response on eth3 and extract the information about the subsystem, such as NQN X and IP address 10.10.13.2, which may have been stored in the name server database and that may be used to communicate with that subsystem, here at IP address 10.10.13.2. It is noted that subsystems may be located on networks that do not include either Host H or CDC SAN A. In one or more embodiments, Host H may use that information to update its IP route table by inserting an entry that links the subsystem with both interface eth3 and next hop 10.10.3.1, such as to indicate that frames destined for 10.10.13.2 should egress from eth3 and use next hop 10.10.3.1. Stated differently, the routing table entry enables Host H to connect to and access subsystem X, for example, to obtain namespaces.

Figure 8:
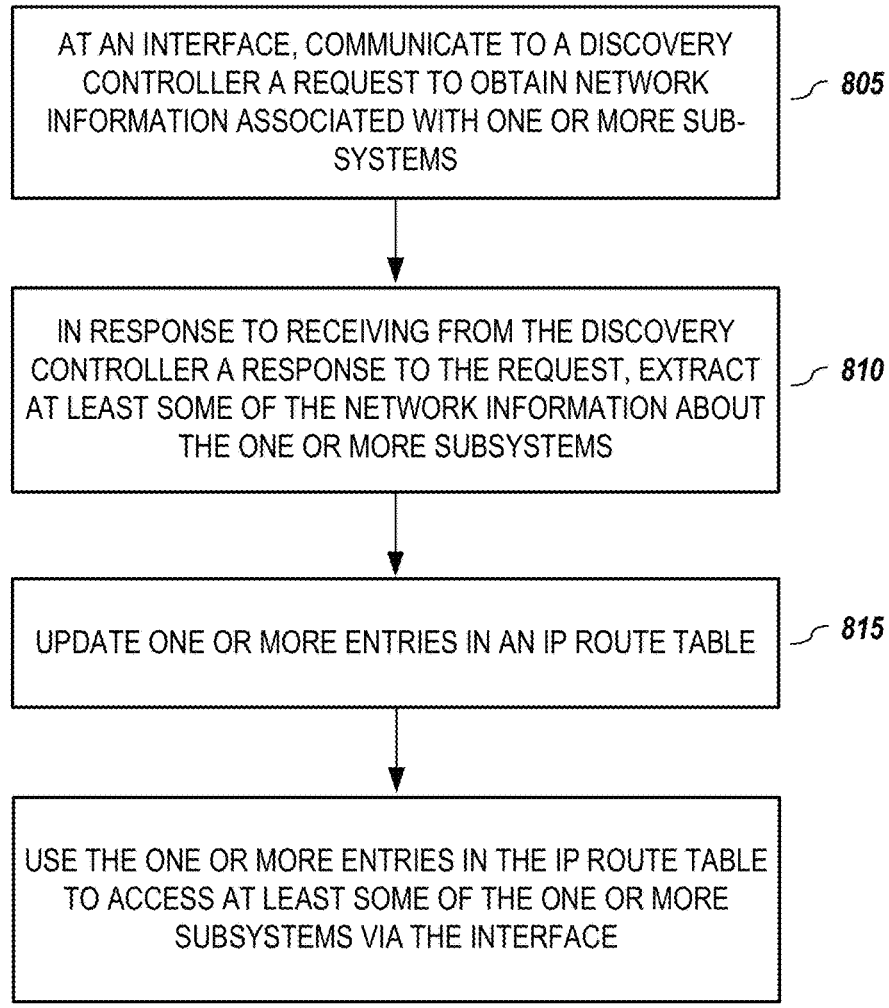
FIG. 8 depicts a flowchart of an exemplary process for obtaining network information for configuring an IP routing table according to embodiments of the present disclosure.

FIG. 8 depicts a flowchart of an exemplary process for obtaining network information for configuring an IP routing table according to embodiments of the present disclosure. In one or more embodiments, process 800 may begin when a host, such as a host in an NVME-oF environment, communicates (805) a request to a discovery controller to obtain network information, e.g., discovery log entries associated with one or more subsystems in the NVME-oF environment. The request may comprise, for example, an NVMe-oF Get Log Page command.

In one or more embodiments, in response to the host receiving a response from the discovery controller, e.g., via a predetermined interface, the host may extract (810) the network information about the one or more subsystems, such as an IP address associated with the subsystem, to update (815) its IP route table, e.g., to enable the host to access (815) the subsystem via the predetermined interface.

Figure 9:
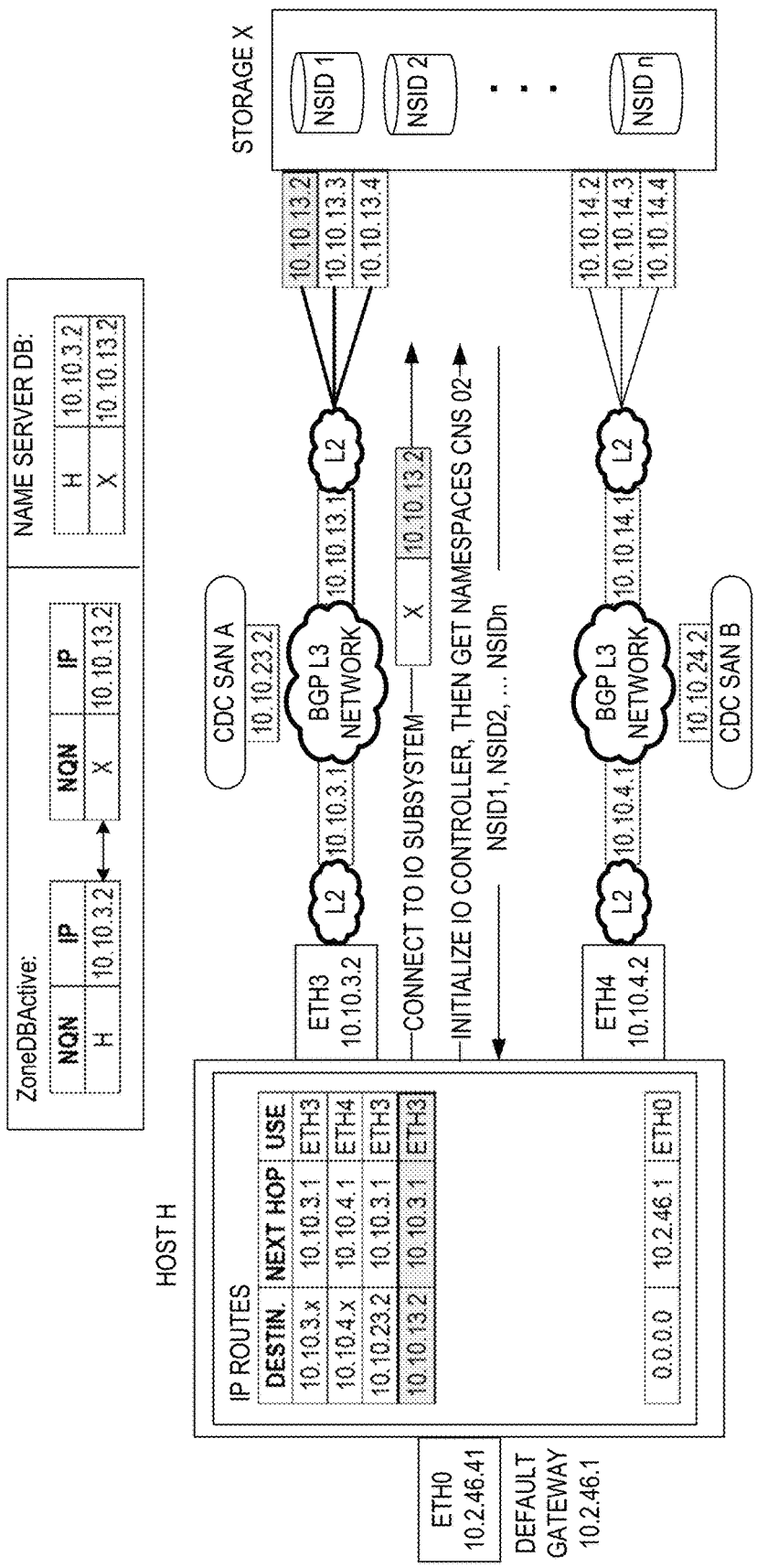
FIG. 9 depicts using network information in an IP routing table to access subsystems in the exemplary NVMe-oF system in FIG. 1 according to embodiments of the present disclosure.

FIG. 9 depicts using network information in an IP routing table to access subsystems in the exemplary NVMe-oF system in FIG. 1 according to embodiments of the present disclosure. In particular, FIG. 9 depicts how, in one or more embodiments, Host H may connect to the subsystem identified by IP address 10.10.13.2, and obtain controller namespaces denoted in FIG. 9 as NSID1, NSID2, . . . NSIDn. It is noted that the controller namespaces should be made available to the host operating system (not shown).

A person of skill in the art will appreciate that Host H and CDC SAN A may undergo a similar process to facilitate connectivity between Host H and I/O subsystem 10.10.13.3 and 10.10.13.4.

Figure 10:
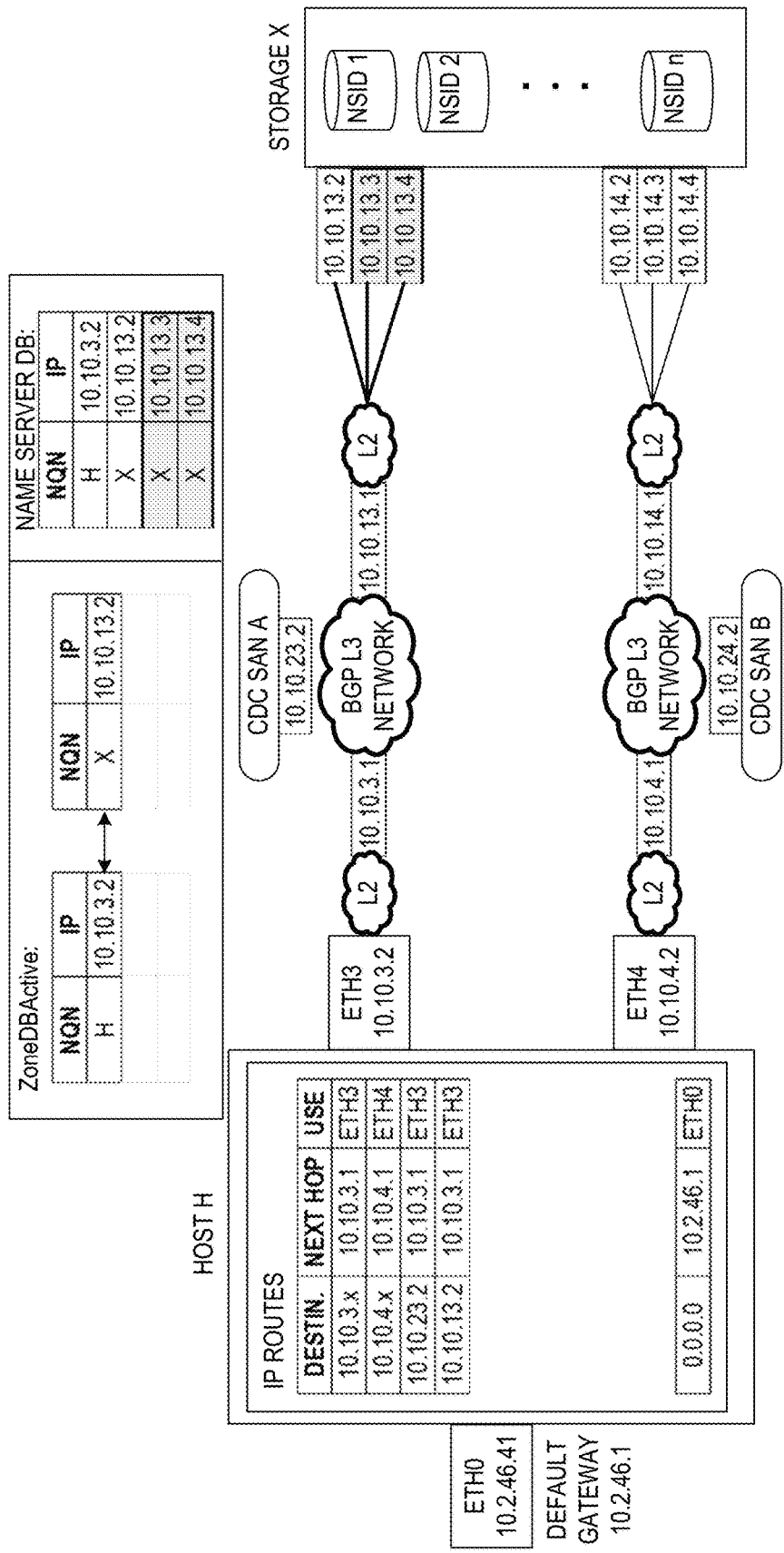
FIG. 10 depicts how storage interfaces may register with a name server database according to embodiments of the present disclosure.
Figure 11:
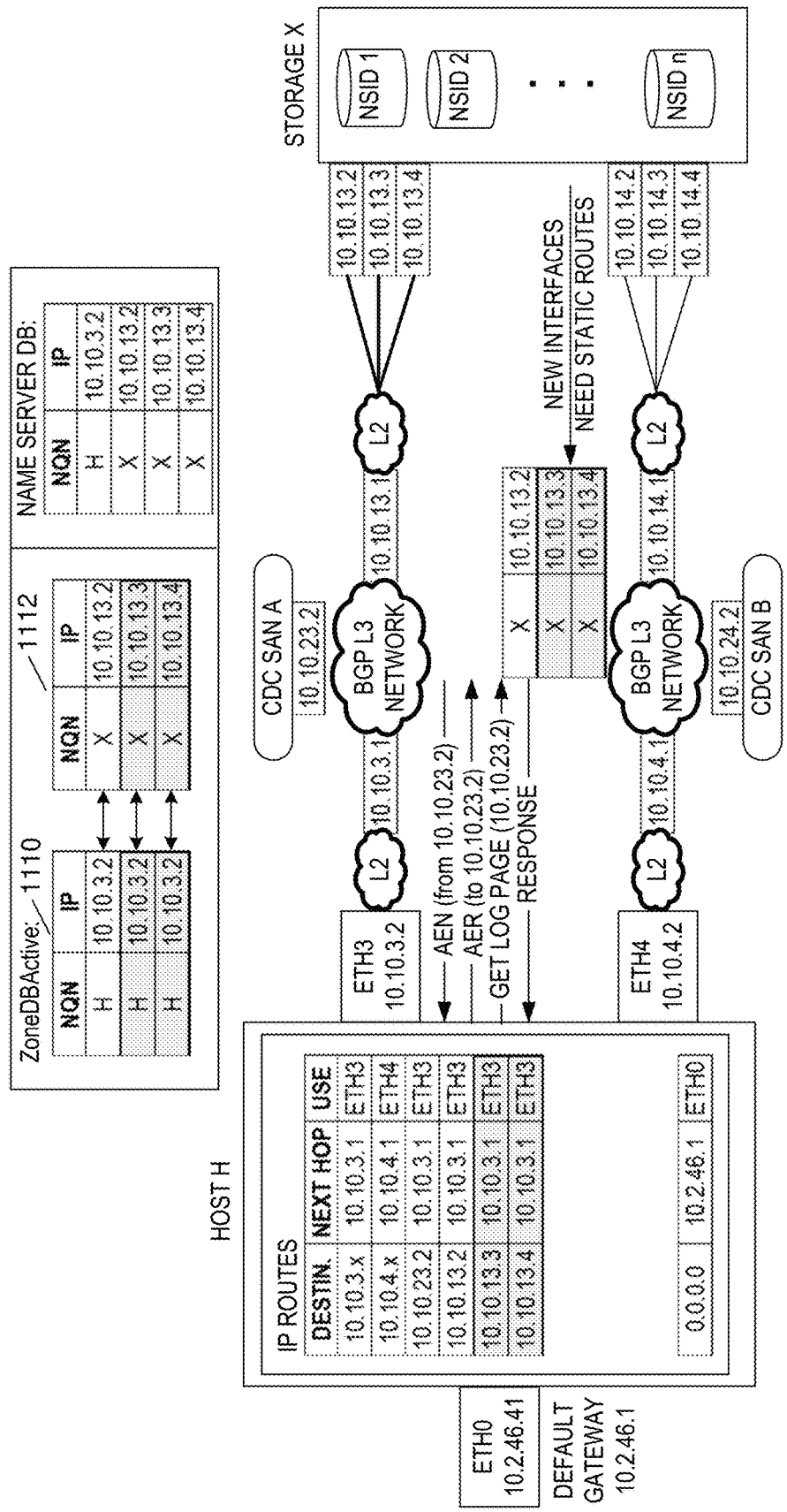
FIG. 11 depicts using network information for updating a host routing table according to embodiments of the present disclosure.

FIG. 10 depicts how Storage X interfaces 10.10.13.3 and 10.10.13.4 register with the Name Server DB according to embodiments of the present disclosure, and FIG. 11 depicts how Host H may use network information to update its routing table according to embodiments of the present disclosure. FIG. 11 further depicts updating CDC SAN A's Zoning database to accommodate a zoning update as indicated by label ZoneDBActive. In one or more embodiments, once a zone group, e.g., a zone group that is defined by one or more entries in tables 1110 and 1112 or by any other information about entities that have permission to communicate with each another over certain interfaces is enabled, CDC SAN A may generate one or more notifications, e.g., an Asynchronous Event Notification (AEN).

In one or more embodiments, Host H may respond to the notification(s), e.g., with another request for discovery log entries, to which CDC SAN A may then respond with information about the three subsystems 10.10.13.2 through 10.10.13.4 on Storage X, such as interface IP address 10.10.13.2 and the two newer interface IP addresses 10.10.13.3 and 10.10.13.4 that may be made available to Host H for inclusion into its routing table.

Figure 12:
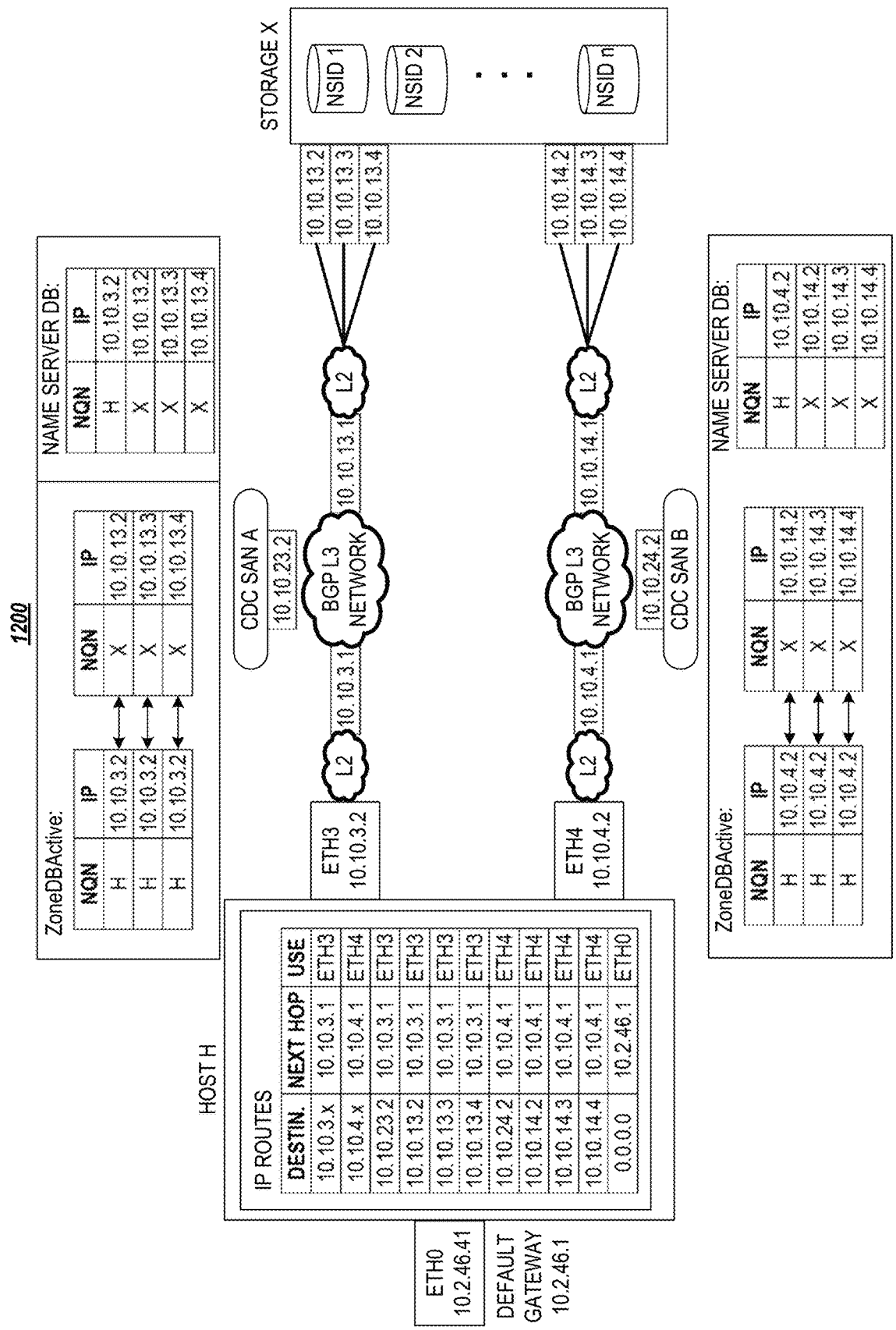
FIG. 12 depicts the exemplary NVMe-oF system in FIG. 1 with fully built routes that have been dynamically configured according to embodiments of the present disclosure.

A person of skill in the art will appreciate that some or all of the previous steps may be repeated for each interface that NVMe-oF will be supported on, such as interfaces 10.10.4.2 and 10.10.14.2-10.10.14.4, e.g., to result in the exemplary NVMe-oF system depicted in FIG. 12, which illustrates an exemplary set of fully built routes that have been dynamically configured according to embodiments of the present disclosure.

A person of skill in the art will further appreciate that entities in NVMe-oF system may utilize software to parse commands to extract sought after information.

In one or more embodiments, stale routes may be removed. In general, routing table entries may be made, updated, and removed dynamically, to configure and manage routes, e.g., host routes, to send NMVe-oF traffic on predetermined interfaces, thereby, preventing NVMe-oF traffic from being sent out of an interface connected to the default gateway, e.g., on a LAN. Typically, as long as there is a chance of traffic (e.g., keep-alives, I/O) being sent to an NVMe-oF subsystem interface or a Discovery Controller, e.g., a CDC or a direct discovery controller, the static routes should remain in place. Stated differently, routes should remain in place as long as a transport connection to a Discovery Controller or I/O controller remains established.

In one or more embodiments, routes to a controller may be removed, e.g., by a route removal process that may comprise performing one or more of (1) deleting namespaces, (2) tearing down the transport connection, and (3) removing a static route.

In one or more embodiments, routes may be removed in response to one or more of the following exemplary events or conditions: (1) a fatal transport error has been detected and a transport connection cannot be re-established (e.g., after num_retries); (2) a Keep-Alive timeout between a host and a controller; (3) receiving a Get Log Page response that no longer includes the IP Address of a controller that was previously included in a response; (4) a user issuing a nvme-cli command: (e.g., nvme disconnect{,-all}); and (5) the ioctl of /sys/class/nvme/ . . . /disk/ . . . /namespace/delete has been called and all namespaces behind a controller have been deleted.

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more drives (e.g., hard disk drives, solid state drive, or both), one or more network ports for communicating with external devices as well as various input and output (I/O) devices, such as a keyboard, mouse, stylus, touchscreen, and/or video display. The computing system may also include one or more buses operable to transmit communications between the various hardware components.

Figure 13:
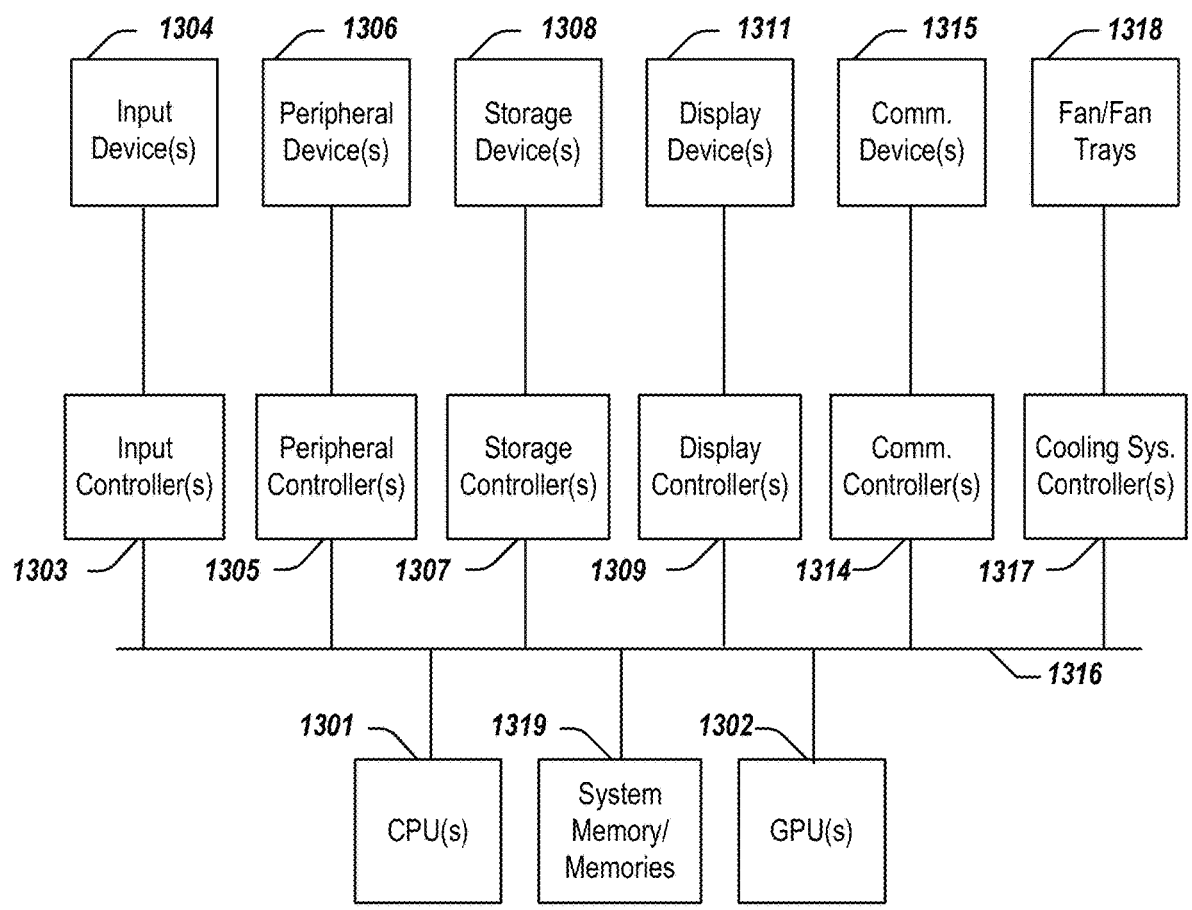
FIG. 13 depicts a simplified block diagram of an information handling system, according to embodiments of the present disclosure.

FIG. 13 depicts a simplified block diagram of an information handling system (or computing system), according to embodiments of the present disclosure. It will be understood that the functionalities shown for system 1300 may operate to support various embodiments of a computing system—although it shall be understood that a computing system may be differently configured and include different components, including having fewer or more components as depicted in FIG. 13.

As illustrated in FIG. 13, the computing system 1300 includes one or more central processing units (CPU) 1301 that provides computing resources and controls the computer. CPU 1301 may be implemented with a microprocessor or the like and may also include one or more graphics processing units (GPU) 1302 and/or a floating-point coprocessor for mathematical computations. In one or more embodiments, one or more GPUs 1302 may be incorporated within the display controller 1309, such as part of a graphics card or cards. The system 1300 may also include a system memory 1319, which may comprise RAM, ROM, or both.

A number of controllers and peripheral devices may also be provided, as shown in FIG. 13. An input controller 1303 represents an interface to various input device(s) 1304, such as a keyboard, mouse, touchscreen, and/or stylus. The computing system 1300 may also include a storage controller 1307 for interfacing with one or more storage devices 1308 each of which includes a storage medium such as magnetic tape or disk, or an optical medium that might be used to record programs of instructions for operating systems, utilities, and applications, which may include embodiments of programs that implement various aspects of the present disclosure. Storage device(s) 1308 may also be used to store processed data or data to be processed in accordance with the disclosure. The system 1300 may also include a display controller 1309 for providing an interface to a display device 1311, which may be a cathode ray tube (CRT) display, a thin film transistor (TFT) display, organic light-emitting diode, electroluminescent panel, plasma panel, or any other type of display. The computing system 1300 may also include one or more peripheral controllers or interfaces 1305 for one or more peripherals 1306. Examples of peripherals may include one or more printers, scanners, input devices, output devices, sensors, and the like. A communications controller 1314 may interface with one or more communication devices 1315, which enables the system 1300 to connect to remote devices through any of a variety of networks including the Internet, a cloud resource (e.g., an Ethernet cloud, a Fiber Channel over Ethernet (FCoE)/Data Center Bridging (DCB) cloud, etc.), a LAN, a wide area network (WAN), a SAN or through any suitable electromagnetic carrier signals including infrared signals. As shown in the depicted embodiment, the computing system 1300 comprises one or more fans or fan trays 1318 and a cooling subsystem controller or controllers 1317 that monitors thermal temperature(s) of the system 1300 (or components thereof) and operates the fans/fan trays 1318 to help regulate the temperature.

In the illustrated system, all major system components may connect to a bus 1316, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Figure 14:
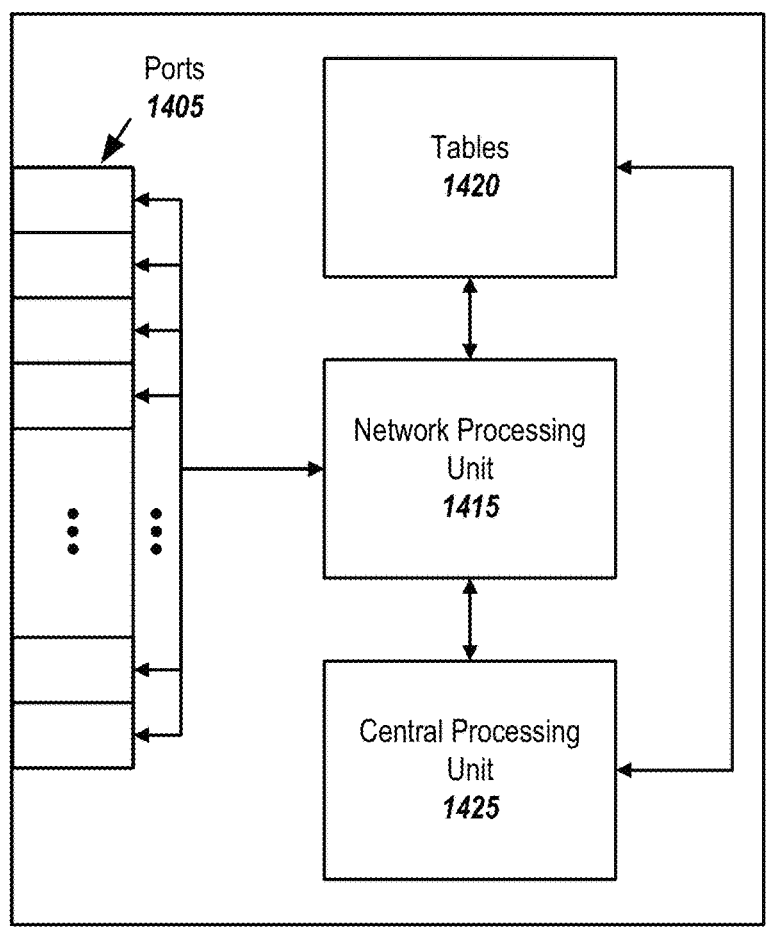
FIG. 14 depicts an alternative block diagram of an information handling system, according to embodiments of the present disclosure.

FIG. 14 depicts an alternative block diagram of an information handling system, according to embodiments of the present disclosure. It will be understood that the functionalities shown for system 1400 may operate to support various embodiments of the present disclosure—although it shall be understood that such system may be differently configured and include different components, additional components, or fewer components.

The information handling system 1400 may include a plurality of I/O ports 1405, a network processing unit (NPU) 1415, one or more tables 1420, and a central processing unit (CPU) 1425. The system includes a power supply (not shown) and may also include other components, which are not shown for sake of simplicity.

In one or more embodiments, the I/O ports 1405 may be connected via one or more cables to one or more other network devices or clients. The network processing unit 1415 may use information included in the network data received at the node 1400, as well as information stored in the tables 1420, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as CDs and holographic devices; magneto-optical media; and hardware devices that are specially configured to store or to store and execute program code, such as ASICs, programmable logic devices (PLDs), flash memory devices, other NVM devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for dynamically managing a routing table in a non-volatile memory express over Fabric (NVMe-oF) system, the method comprising:
    for an NVMe-oF system comprising, establishing a first connection between a host and a discovery controller, the host comprising a routing table that associates a destination internet protocol (IP) address with a non-IP-address host interface identifier associated with a host interface used for communicating with the destination IP address;
    receiving, from the discovery controller, network information that allows discovery of a storage device; and
    using at least some of the network information that was received from the discovery controller to dynamically configure an entry in the routing table that correlates a first non-IP-address host interface identifier associated with a first host interface of the host with a storage device IP address to facilitate a second connection between the host and the storage device via the first host interface and a storage interface that is associated with the storage device IP address.

2. The computer-implemented method of claim 1, wherein the host obtains the network information in response to communicating a NVMe-oF data transport protocol command to the discovery controller.

3. The computer-implemented method of claim 1, wherein the network information identifies the storage interface using the storage device IP address.

4. The computer-implemented method of claim 1, wherein establishing the first connection comprises, in response to an mDNS (multicast domain name system) query, receiving an mDNS response that identifies the discovery controller.

5. The computer-implemented method of claim 4, wherein establishing the first connection further comprises at least one of initializing the discovery controller, registering the host with the discovery controller, requesting asynchronous event notification messages, or transmitting a keep-alive command to the discovery controller.

6. The computer-implemented method of claim 1, wherein the discovery controller comprises, in a name server database, NVMe Qualified Names (NQNs) for the first host interface and the storage interface.

7. The computer-implemented method of claim 6, wherein the NQNs are used in two or more tables in the discovery controller that associate at least some of the network information to form an access control zone that indicates that the storage device on the storage interface is allowed to be accessed by the first host interface.

8. An information handling system for dynamically managing a routing table in a non-volatile memory express over Fabric (NVMe-oF) system, the system comprising:
one or more processors; and
a non-transitory computer-readable medium or media comprising one or more sets of instructions which, when executed by at least one of the one or more processors, causes steps to be performed comprising:
for an NVMe-oF system comprising, establishing a first connection between a host and a discovery controller, the host comprising a routing table that associates a destination internet protocol (IP) address with a non-IP-address host interface identifier associated with a host interface used for communicating with the destination IP address;
receiving, from the discovery controller, network information that allows discovery of a storage device; and
using at least some of the network information that was received from the discovery controller to dynamically configure an entry in the routing table that correlates a first non-IP-address host interface identifier associated with a first host interface of the host with a storage device IP address to facilitate a second connection between the host and the storage device via the first host interface and a storage interface that is associated with the storage device IP address.

9. The information handling system of claim 8, wherein the host obtains the network information in response to communicating a NVMe-oF data transport protocol command to the discovery controller.

10. The information handling system of claim 8, wherein the network information identifies the storage interface using the storage device IP address.

11. The information handling system of claim 8, wherein establishing the first connection comprises, in response to an mDNS (multicast domain name system) query, receiving an mDNS response that identifies the discovery controller.

12. The information handling system of claim 11, wherein establishing the first connection further comprises at least one of initializing the discovery controller, registering the host with the discovery controller, requesting asynchronous event notification messages, or transmitting a keep-alive command to the discovery controller.

13. The information handling system of claim 8, wherein the discovery controller comprises a name server database that comprises at least one NVMe Qualified Name (NQN) for the first host interface and the storage interface, the at least one NQN being used to register the host with the discovery controller.

14. The information handling system of claim 13, wherein the at least one NQN is used in two or more tables in the discovery controller that associate at least some of the network information to form an access control zone that indicates that the storage device on the storage interface is allowed to be accessed by the first host interface.

15. A non-transitory computer-readable medium or media comprising one or more sequences of instructions which, when executed by at least one processor, causes steps to be performed comprising:
for an NVMe-oF system comprising, establishing a first connection between a host and a discovery controller, the host comprising a routing table that associates a destination internet protocol (IP) address with a non-IP-address host interface identifier associated with a host interface used for communicating with the destination IP address;
receiving, from the discovery controller, network information that allows discovery of a storage device; and
using at least some of the network information that was received from the discovery controller to dynamically configure an entry in the routing table that correlates a first non-IP-address host interface identifier associated with a first host interface of the host with a storage device IP address to facilitate a second connection between the host and the storage device via the first host interface and a storage interface that is associated with the storage device IP address.

16. The non-transitory computer-readable medium or media of claim 15, wherein the host obtains the network information in response to communicating a NVMe-oF data transport protocol command to the discovery controller.

17. The non-transitory computer-readable medium or media of claim 15, wherein establishing the first connection comprises, in response to an mDNS (multicast domain name system) query, receiving an mDNS response that identifies the discovery controller.

18. The non-transitory computer-readable medium or media of claim 17, wherein establishing the first connection further comprises at least one of initializing the discovery controller, registering the host with the discovery controller, requesting asynchronous event notification messages, or transmitting a keep-alive command to the discovery controller.

19. The non-transitory computer-readable medium or media of claim 15, wherein the discovery controller comprises a name server database that comprises NVMe Qualified Names (NQNs) for the first host interface and the storage interface, the discovery controller updates one or more of the NQNs prior to communicating the network information to the host.

20. The non-transitory computer-readable medium or media of claim 19, wherein the NQNs are uses in two or more tables in the discovery controller that associate at least some of the network information to form an access control zone that indicates that the storage device on the storage interface is allowed to be accessed by the first interface.

* * * * *